Dec. 1, 1931.  C. W. EBLING  1,834,270
SYNCHRONIZING MEANS FOR MOTION PICTURE PROJECTORS
AND SOUND REPRODUCING MECHANISMS
Filed Sept. 29 1928    4 Sheets-Sheet 3
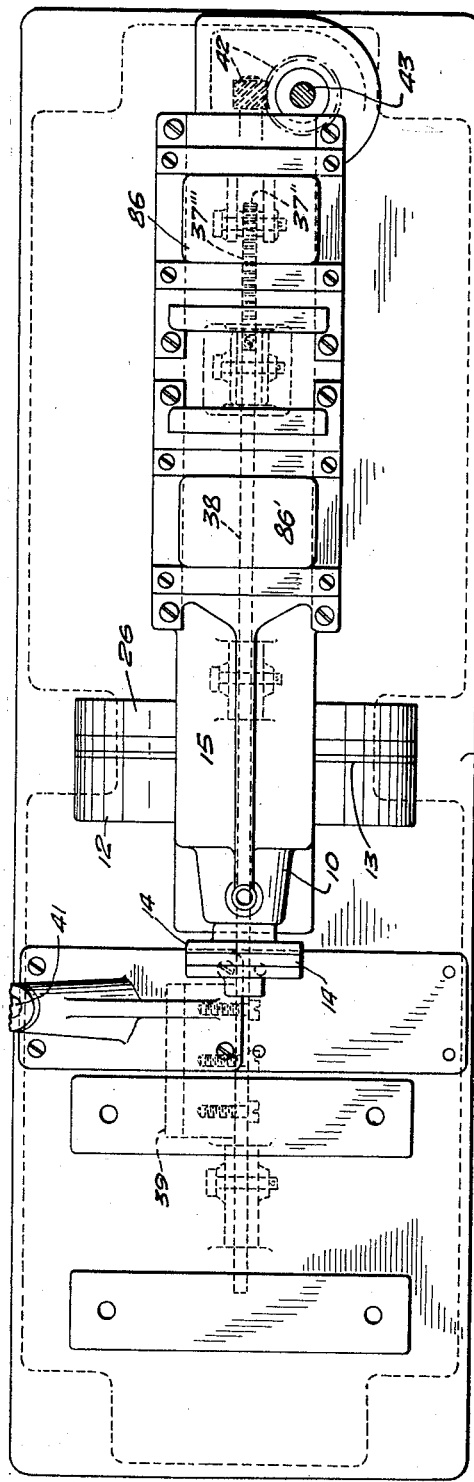
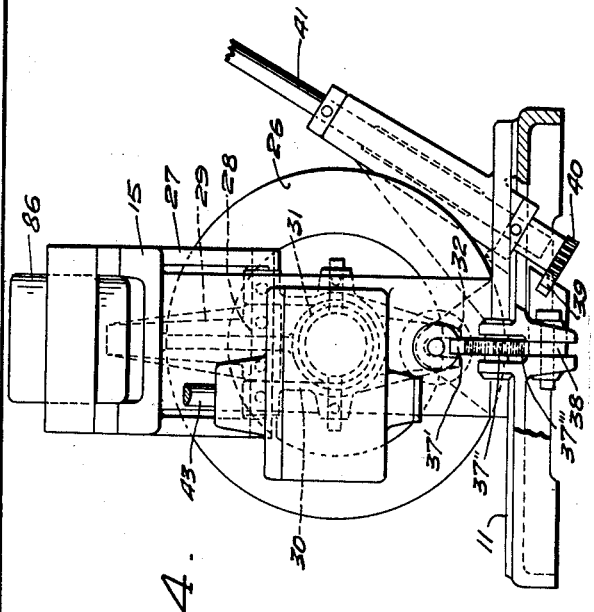
Inventor
CHARLES W. EBLING
By
Attorney Dec. 1, 1931.  C. W. EBLING  1,834,270
SYNCHRONIZING MEANS FOR MOTION PICTURE PROJECTORS
AND SOUND REPRODUCING MECHANISMS
Filed Sept. 29, 1928   4 Sheets-Sheet 4
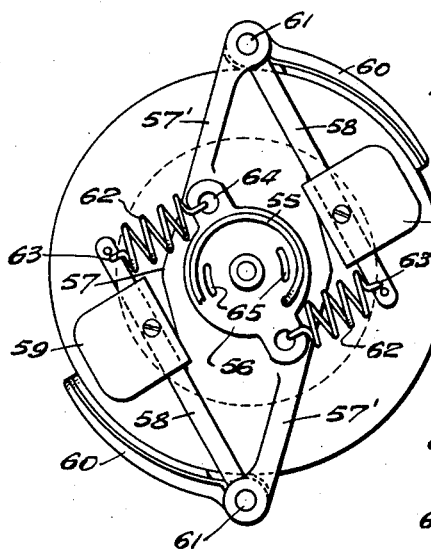
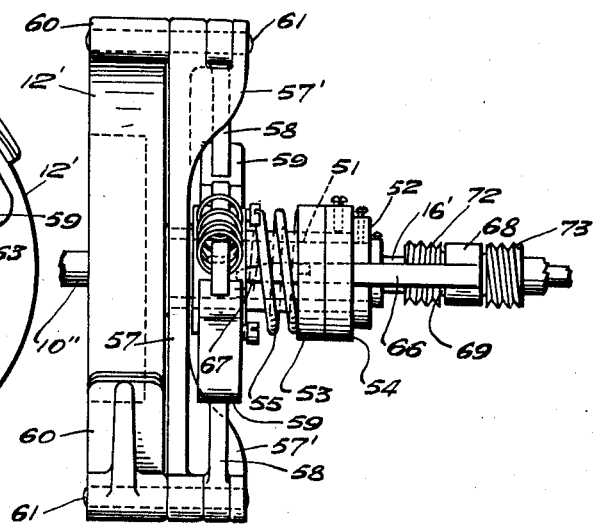
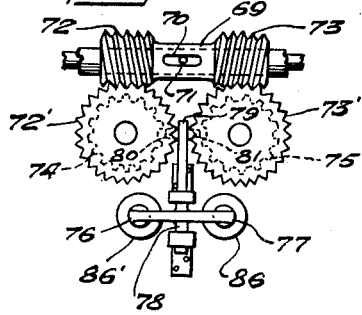
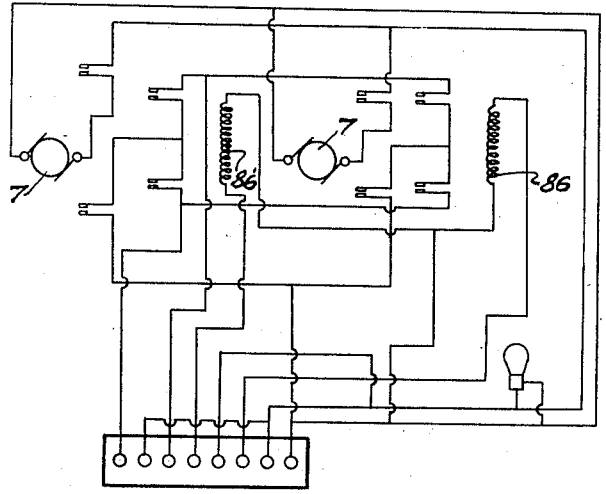
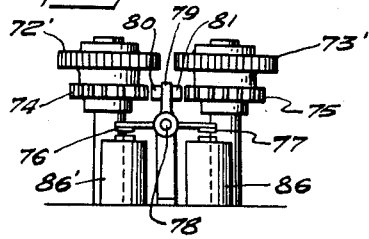
Inventor
CHARLES W. EBLING
By
Attorney Patented Dec. 1, 1931

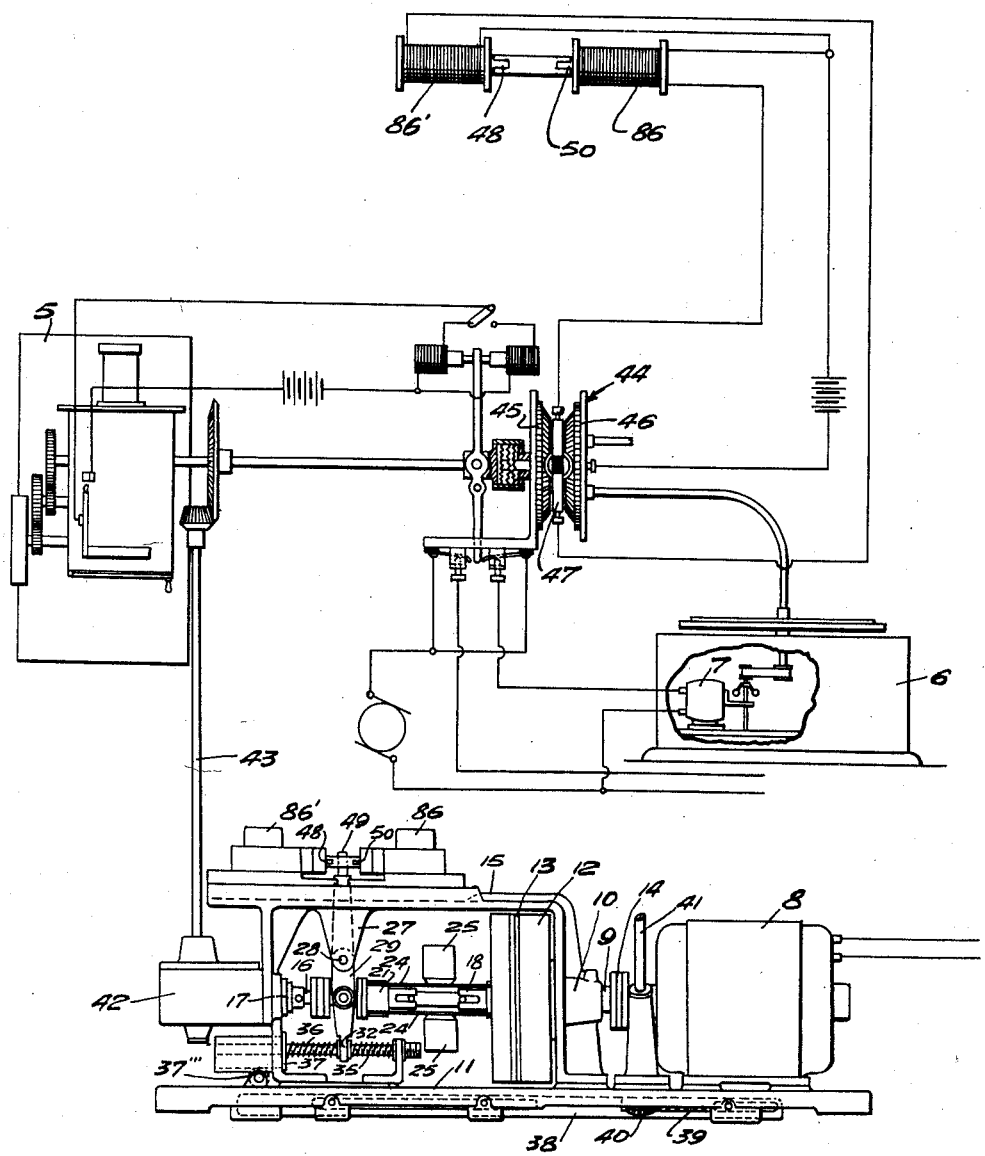

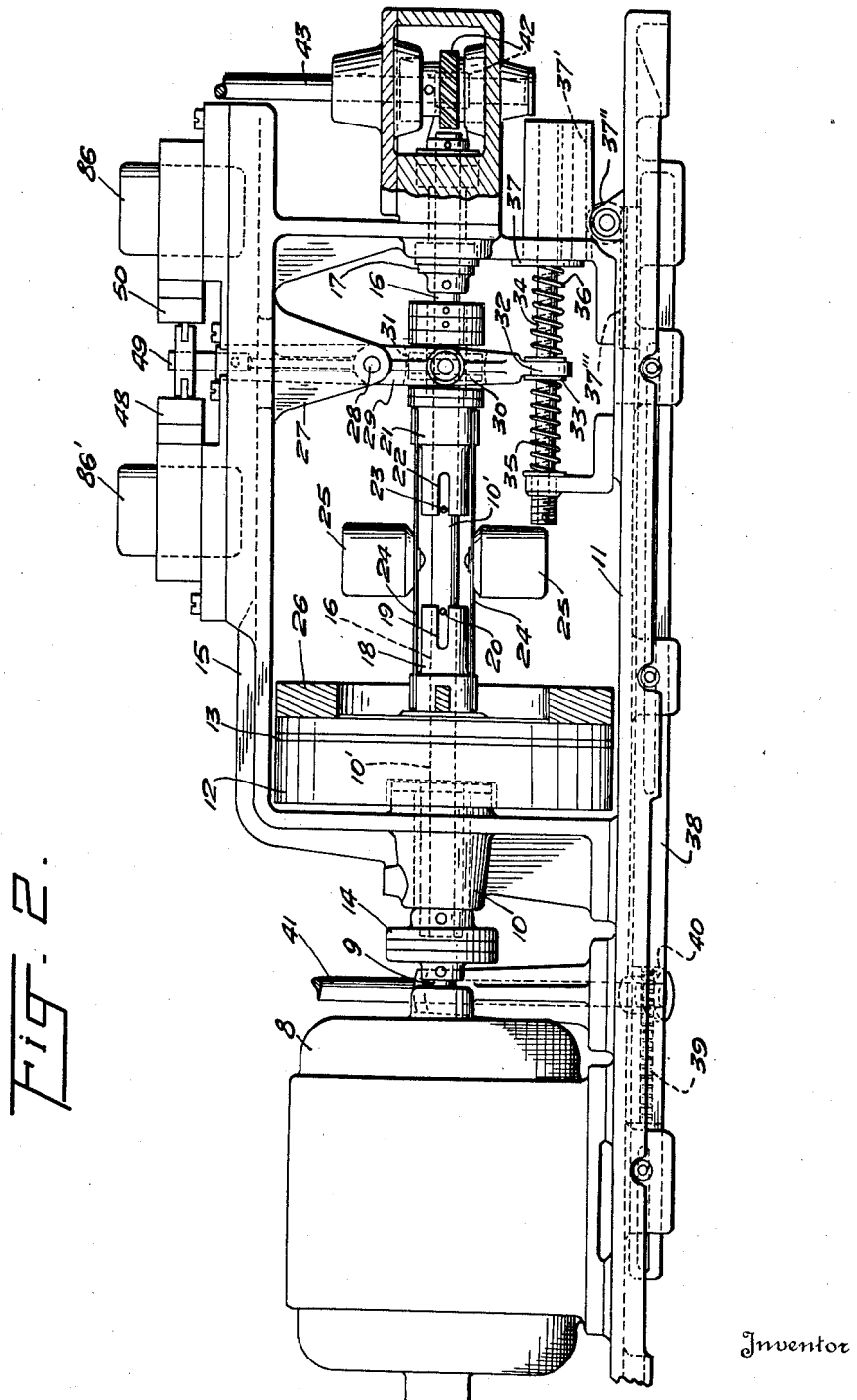

1,834,270

UNITED STATES PATENT OFFICE

CHARLES W. EBLING, OF NEW YORK, N. Y.

SYNCHRONIZING MEANS FOR MOTION PICTURE PROJECTORS AND SOUND REPRODUCING MECHANISMS

Application filed September 29, 1928. Serial No. 309,328.

This invention relates to improvements in synchronizing means for motion picture projectors and sound reproducing mechanisms, one object of the invention being the provision of a simplified arrangement of the construction shown in my Patent No. 1,303,047, dated May 6, 1919, in that I dispense with the reversible motor therein shown and the mechanism controlled thereby for regulating the speed.

Another object of this invention is the provision of a novel arrangement of synchronizing mechanism and speed delivering mechanism so combined and coordinated as to be readily operable to start the two machines, that is, the motion picture projector and the sound reproducing machine and maintain the same in synchronism.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a diagrammatic view of the complete mechanism including a motion picture projector and a single sound reproducing machine;

Figure 2 is a side elevation of the electric motor and speed controlling mechanism operated thereby;

Figure 3 is a top plan view of the same with the motor removed;

Figure 4 is an end view thereof;

Figure 5 is a view showing an external clutch device;

Figure 6 is a side view thereof;

Figure 7 is a detail view of the automatic means for varying the clutch action of the clutch device shown in Figs. 5 and 6;

Figure 8 is a side view thereof;

Figure 9 is a diagrammatic view of the electrical circuits for two alternately operated sound reproducing machines and the synchronizing devices controlled thereby to, in turn, operate the control electric magnets for the projector motor circuit.

Referring to the drawings, the numeral 5 designates the motion picture projector and 6 the sound reproducing machine, said sound reproducing machine being provided with its operating motor 7 which is operated independently of the projector operating motor 8.

The motor 8 drives the shaft 9 mounted in the bearing 10 upon the base 11 and through the shaft 10' operates a fly-wheel 12, the outer face 13 of which is a friction face. The shaft 10 is connected by a flexible connection 14 to the motor shaft and the fly-wheel 12 rotates within the frame 15 carried by the base 11. A shaft 16 is journaled in the bearing 17 at one end and within the short tubular shaft 10' at the opposite end and has slidably mounted thereon the sleeve 18 which is provided with diametrically opposite slots 19 which coact with the pins 20 so that the sleeve 18 will be rotated with the shaft 16. A second sleeve 21 is also mounted upon the shaft 16 and through the slots 22 and pins 23 is also mounted to rotate with the shaft. The springs 24 with the weights 25 connect the sleeves 18 and 21 and form a centrifuge device for, in turn, operating the friction disk 26 which is connected to and movable with the sleeve 18.

The friction disk 26 is adapted to coact with the friction face 13 of the fly-wheel 12 so that the shaft 16 will be rotated through the governor clutch arrangement and at the desired speed, the centrifuge device operating, as will presently appear, to cause the connection or disconnection of the shaft 16 from the shaft 9.

Mounted in the depending arms 27 of the frame 15 at 28 is the control lever 29, said lever having its yoke 30 between the fixed spool 31 fast to the sleeve 21, the lower yoke end 32 of said lever fitting astride the spool 33 slidably mounted upon the shaft 34 and is balanced by the two opposed springs 35 and 36 which normally hold the lever in a vertical position, as illustrated. The shaft 34 is connected at one end to the slidable spool 37 which is moved through the rack 37', the intermediate gear 37'' and the rack 37''' carried by the plate 38. The plate 38 at its opposite end has a rack 39 meshing with the gear 40, which is mounted upon the manually controlled shaft 41. Thus the rotation of the shaft 41 adjusts the spool 37 to regulate the spring tension exerted upon the yoke 32 and consequently upon the centrifuge device to regulate the tension of the friction disk 26 against the fly-wheel 12, and in such a manner that the centrifuge device may be operated at varying speeds before it will release automatically, this being desirable in operating the projector which, however, under present conditions, is desired to be maintained at a speed of 80 revolutions per minute.

The shaft 16, as shown, is provided with reducing gears 42 which connect the same to the projector operating shaft 43. Thus, it will be seen that by this means the motor will operate the projector at the desired speed and that the control lever 29 by means of the springs 35 and 36 will regulate the tension or pressure of the centrifuge device so that the same may be operated at any desired speed to disconnect the projector from the main drive shaft 9. In order that the sound reproducing machine may assist in controlling the speed of the projector and do the same automatically, the magnets 86 and 86' which correspond to the same magnets in the before-mentioned patent are controlled in a similar manner by means of the synchronizing device 44 which comprises two opposed gears 45 and 46 and an indicating or switch member 47. By this means, should the sound reproducing machine slightly slow down, the switch member will be moved to energize the electro-magnet 86 which, in turn, will operate its core 48 and move the upper end of the lever 29 to which said core is connected by means of the rod 49 to cause the lower end 32 to compress the spring 36 and release the spring 35 and thus reduce the tension exerted upon the centrifuge device, which will then operate to release the friction disk at a lower speed of the shaft 10' and thus slow down the speed delivered to the projector. If, on the other hand, the sound reproducing machine should speed up and it is desirable to speed the projector, the electro-magnet 86 is energized and through its core 50 and the connection with the lever 29 will operate the lever in the opposite direction and thus exert a greater spring tension upon the centrifuge device and cause the friction disk 26 to more firmly grip the fly-wheel.

In Figures 5, 6, 7 and 8 is shown a clutch and operating means which does not exert an end thrust upon the motor, as is the case with the clutch heretofore described. In this instance, the fly-wheel 12' is gripped peripherally, and there is mounted upon the shaft 10'', for rotation therewith, a sleeve 51, having mounted thereon the annuli 52, 53 and 54, the spring 55 being the connecting or transmitting medium between the sleeve and the plate 56, and the member 57 and arms 57'. These arms have pivoted or similarly connected at 61 to the free ends thereof the levers 58, which are centrifuge members carrying the adjustable weights 59, with the brake or clutch plates 60 opposed to the periphery of the wheel 12'. The springs 62 are connected at 63 to the levers and to the legs 64 of the plate 56, and as said plate is adjustable independently of the sleeve 51, the tension of the spring 62 may be varied to vary the speed required to release the clutch, the springs corresponding to the springs 35 and 36 heretofore described.

In order to accomplish this, the two arcuate slots 65 are provided in the plate 56, and carried by and slidable in diametrically formed grooves in the sleeve 56 are the arms 66, the free ends 67 of which are wedge-shaped and operated to move the plate in one direction to place greater tension on the springs 62 when it is desired to grip the clutch together and acquire greater speed to release the same, or vice versa. The arms 66 are connected to a common operating sleeve 68 fitted upon and movable with the operating sleeve 69, which, through the slot 70 and pin 71, is mounted to contact with the shaft 10''. Also fast to the sleeve are the oppositely toothed worms 72 and 73, which are in gear at all times with their respective gears 72' and 73' disposed at right-angles to and fast to the respective ratchet wheels 74 and 75. Thus, as the shaft 10'' rotates, these gears also are rotated.

In order to increase or decrease the tension of the springs 62, as in the previous description, the electric magnet 86 or 86' is energized, and the armature 76 or 77 is attached and the shaft 78 is rocked, the arm 79 carried thereby placing a detect 80 or 81 in engagement with either ratchet wheel 74 or 75, and thus halting either gear 72' or 73'. By halting gear 72', the sleeve 69 being turned, the worm 72 will move the sleeve to the right as viewed in Figure 6, and thus release the springs 62 which, if the gear 73' is halted, the sleeve 69 will slide to the left and cause the plate 56 to be moved to tighten the springs 62. When neither magnet 86 and 86' is energized, the armature 76—77 being spring-controlled, will assume a neutral position so that both gears 72' and 73' are rotated freely by the worm 72 and 73.

From the foregoing description, it is evident that with this arrangement the reversible motor and the differential mechanism interposed between it and the drive shaft of the projector as shown in the before-mentioned patent are disposed of and the present simple mechanism substituted therefor.

I claim:—

1. In a device of the class described, the combination with two machines, an independent motor for each machine, an adjustable governor interposed between one machine and its motor, and including a centrifuge clutch for connecting one motor to one machine, and an electrically controlled means for regulating the speed at which the clutch releases, of automatic means controlled by the other machine to in turn control the electrically controlled means to cause the speed of the first machine to alter in accordance with the speed of the second machine.

2. In a device of the class described, the combination with two machines, an independent motor for each machine, an adjustable governor interposed between one machine and its motor, and including a centrifuge clutch for connecting one motor to one machine, an electrically controlled means for regulating the speed at which the clutch releases, of automatic means controlled by the other machine to in turn control the electrically controlled means to cause the speed of the first machine to alter in accordance with the speed of the second machine, and manually selective means for setting the centrifuge clutch at will.

3. In a device of the class described, the combination with two machines, an independent motor for each machine, an adjustable governor interposed between one machine and its motor, and manually selective means for adjusting said governor, of automatic means controlled by the other machine for adjusting the governor independent of the manually selective means and to maintain the speed of the first machine in proper speed ratio to the other machine, the manually selective means including a lever operably connected to the governor, two opposed springs for holding the lever in equilibrium, and manually selective means for varying the spring action to in turn cause the lever to permit a retarding or accelerating action through the governor.

4. In a device of the class described, the combination with two machines, an independent motor for each machine, an adjustable governor interposed between one machine and its motor, and manually selective means for adjusting said governor, of automatic means controlled by the other machine for adjusting the governor independent of the manually selective means and to maintain the speed of the first machine in proper speed ratio to the other machine, the adjustable governor including a base, a clutch mounted thereon, a centrifuge device connected to one member of the clutch, a lever pivotally connected to the base and connected to the centrifuge device at the end opposite to the clutch, two springs operably connected to one free end of the lever to normally hold the lever in a non-stressed position, manually operable means mounted in the base and connected to vary the biasing action of the springs, and electrically actuated means connected to the other free end of the lever for automatically varying the bias of the springs and the action of the centrifuge device.

5. In a device of the class described, the combination with two machines, an independent motor for each machine, an adjustable governor interposed between one machine and its motor, and manually selective means for adjusting said governor, of automatic means controlled by the other machine for adjusting the governor independent of the manually selective means and to maintain the speed of the first machine in proper speed ratio to the other machine, the adjustable governor including a base, a clutch mounted thereon, a centrifuge device connected to one member of the clutch, a lever pivotally connected to the base and connected to the centrifuge device at the end opposite to the clutch, two opposed springs operably connected to one free end of the lever to normally hold the lever in a non-stressed position, a sliding plate mounted in the base and operably connected to regulate the tension of said springs, a rotatable hand actuated rod mounted in the base, cooperative means connecting the rod and plate so that the movement of the rod slides the plate to increase or decrease the tension of the springs and cause a retardation or acceleration of the centrifuge device, and electrically actuated means connected to the end of the lever remote from the plate and controlled from a distant point to reciprocate the lever and thus automatically adjust the tension of the springs through the lever.

In testimony whereof I have hereunto set my hand.

CHARLES W. EBLING.